Nov. 28, 1967    W. M. ROLL ET AL    3,354,844
WAFERING MACHINE DIE AND ROTOR STRUCTURE
Original Filed Dec. 28, 1961    3 Sheets-Sheet 1

INVENTORS
W. M. ROLL
M. W. FORTH
R. E. HARRINGTON

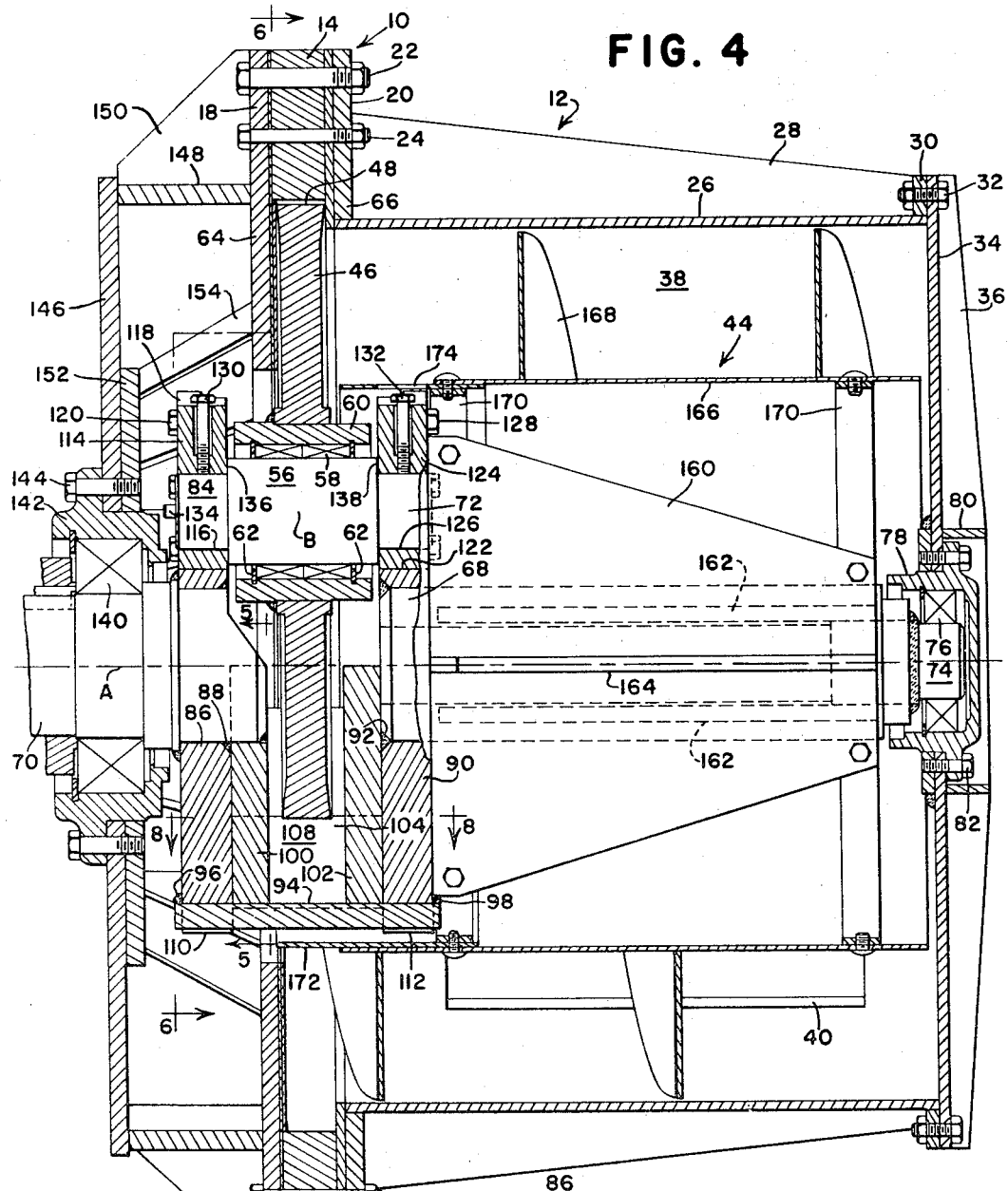

Nov. 28, 1967  W. M. ROLL ET AL  3,354,844
WAFERING MACHINE DIE AND ROTOR STRUCTURE
Original Filed Dec. 28, 1961  3 Sheets-Sheet 3

INVENTORS
W. M. ROLL
M. W. FORTH
R. E. HARRINGTON

United States Patent Office 3,354,844
Patented Nov. 28, 1967

3,354,844
WAFERING MACHINE DIE AND ROTOR STRUCTURE
Walter M. Roll, Murray W. Forth, and Roy E. Harrington, Moline, Ill.; said Roll and said Forth assignors to Deere & Company, Moline, Ill., a corporation of Delaware
Continuation of application Ser. No. 363,045, Apr. 16, 1964, which is a continuation of application Ser. No. 162,670, Dec. 28, 1961. This application May 5, 1965, Ser. No. 453,306
18 Claims. (Cl. 107—14)

This application is a continuation of Ser. No. 363,045, filed April 16, 1964, as a continuation of Ser No. 162,670, filed Dec. 28, 1961, and both of which are now abandoned.

This invention relates to a wafering machine die and rotor structure and more particularly to significant improvements in the design of the rotor and allied components which materially increase the efficiency and service life of the machine.

By way of definition, the term "wafering" has come to be applied to that process in which forage crops, such as hay, grasses, straw, etc. are compacted and extruded under substantial pressures in the form of wafers of relatively small size as compared to high-density bales produced by the conventional agricultural baler. Experience has shown that, in the design and operation of such wafering machines, little if any successful design duplication can be obtained from prior art machines of the so-called pellet mill type, because such machines are relatively small, operate under higher pressures and fundamentally are designed to handle granular or similar pulverulent material as distinguished from the stalks, stems, leaves, etc., that are characteristic of forage products. However, like a pellet mill, a wafering machine will, in a typical instance, include an annulus in the form of a ring or the like of uniformly circumferentially spaced apart generally radial die openings having, in most cases, their inner ends common to a circle concentric with the inner periphery of the ring and about which one or more press wheels or rollers operate in orbiting relation, rolling over the open ends of the die openings to force material into the openings, which material is subsequently compacted and ultimately extruded as wafers. In a pellet mill, for example, the die ring will be made up of a casting or forging having several axially spaced rows of circumferentially spaced die openings, each being of relatively small size and of such characteristic that the openings may be formed by boring, broaching, etc., whereas in a wafering machine the structure is considerably larger, the openings are preferably rectangular in cross section, and the annulus is preferably made up of a plurality of rigidly interconnected parts rather than a single forging or casting. The press wheel or roller, to operate in its orbital path, is carried on a wheel shaft eccentric to the axis of the annulus and joined by crank arm means to a main shaft journaled on the axis of the annulus, often in conjunction with an auger or similar means, coaxial therewith, which feeds material axially to the "crescent" between the rim or periphery of the press wheel or roller and the inner periphery of the annulus. As already indicated, because of the nature of the material and the feeding problems involved, forces and pressures of considerably high magnitude are presented, and it is therefore expedient that the structure be relatively heavy and rigid. On the other hand, it is desired that the weight be adequately distributed to maintain a proper weight-to-strength ratio in critical areas.

Accordingly, the principal object of the present invention is to provide an improved wafering machine in general and principally to improve the construction of the rotor, which includes the crank, auger and press wheel or wheels. In this regard, it is a significant object to provide a crank shaft or rotor assembly carrier in which the press wheel is journaled on a press wheel shaft which affords the pin or throw of the crank shaft and to mount opposite ends of the wheel shaft rigidly between a pair of cheek members which in turn are reinforced against relative axial displacement resulting from bending forces imposed on the press wheel as it operates in conjunction with the die annulus. A further object of the invention resides in means for adjusting the eccentricity of the press wheel relative to the axis of the annulus so as to obtain adjustment of the running clearance between the periphery of the press wheel and the inner periphery of the annulus. Further objects reside in improvement of the reinforcing and supporting of various elements of the structure, in means for removably mounting the wheel shaft in the crank shaft assembly, and in such other objects and features as will become apparent as a preferred embodiment of the invention is disclosed in detail in the ensuing description and accompanying sheets of drawings, the figures of which are described below.

FIG. 4 is a section, on an enlarged scale, as would be seen generally along line 4—4 of FIG. 2.

FIG. 5 is a section, on a reduced scale, as would be seen along the line 5—5 of FIG. 4.

Figure 2:
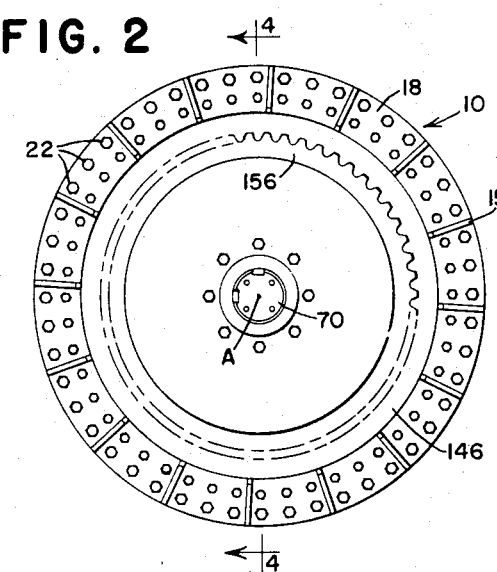
FIG. 2 is a front view of the same.
Figure 1:
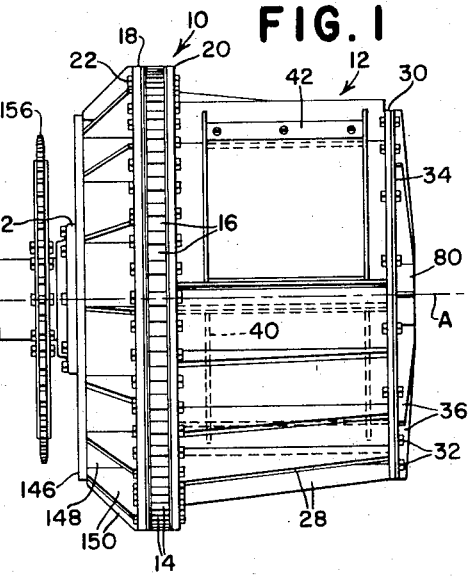
FIG. 1 is an elevational view of a representative wafering machine as seen from the outside.
Figure 6:
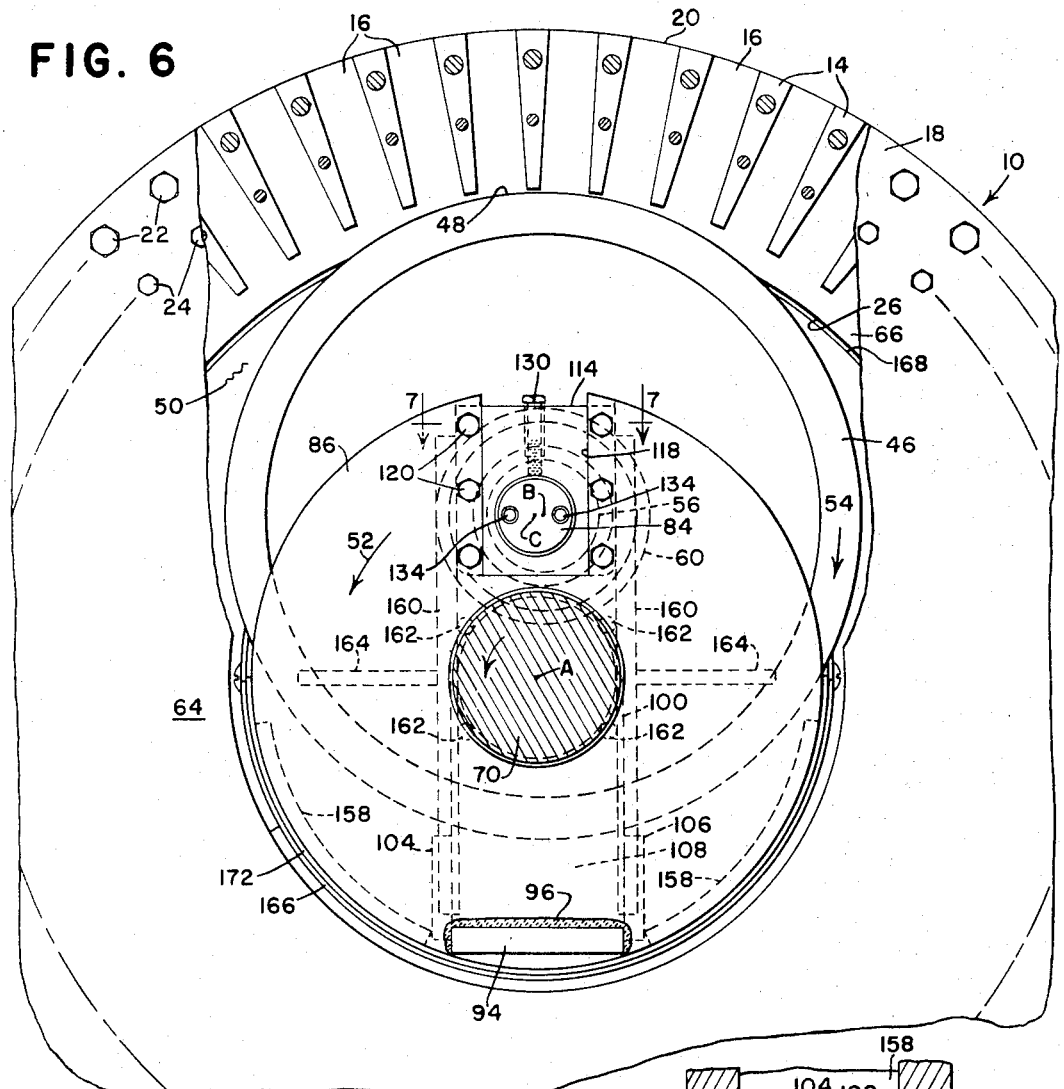
FIG. 6 is a fragmentary sectional view, partly in elevation, as would be seen along the line 6—6 of FIG. 4.

Reference will be had first to FIGS. 1, 2, and 6 for purposes of orientation. From these views, it will be seen that the wafering machine includes a die annulus 10 having rigidly attached to one side thereof a generally cylindrical housing 12 into which material is fed for axial transmission to the interior of the annulus 10 for compaction and extrusion through die openings provided in the annulus. These openings are uniformly circumferentially spaced apart and are generally radial, being established by the provision of uniformly circumferentially spaced radial die blocks 14, there being of course an opening 16 between each pair of neighboring blocks. In a representative construction, the annulus will be made up of a pair of radially parallel circular plate structures 18 and 20 rigidly cross-connected as by a plurality of bolts 22 and 24. The inner ends of the die blocks 14 lie on what may be regarded as a circle concentric about the principal axis of the annulus, which is also the principal axis of the housing 12. For purposes of identification, this axis is labeled A. The "circle" established by the inner ends of the die blocks represents the inner peripheral surface of the die annulus 10; although, it will of course be appreciated that this "circle" is incomplete because of the inlet ends of the die openings and further because the inner ends of the die blocks may be straight rather than arcuate. However, the expression has been adopted in the field and accordingly has the meaning given thereto here.

The plate 18 is in the form of a ring disposed at the outer or front end of the annulus, and the plate 20, also a ring, is disposed at the rear of the annulus and serves as a support ring for a tubular or coaxially cylindrical part 26 of the housing structure 12 (FIG. 4). External reenforcing ribs 28 may be utilized to add strength to the housing structure, these ribs being preferably welded to the cylinder 26 as well as being welded to the ring 20. The end of the cylindrical housing 26, axially remote from the annulus 10, is provided with a mounting rim or flange 30. This rim or flange may be welded to the end of the cylindrical housing and has rigidly secured thereto, as by a circle of bolts 32, a radial end wall structure 34 having radial reenforcing ribs 36. The space within the cylindrical housing 26 between the end wall structure 34 and the interior of the annulus 10 constitutes a feed or material-receiving chamber 38, and the housing is provided at one side with a rectangular feed opening 40 and at its substantially dimetrically opposite side with an inspection opening normally closed by a cover 42 (FIG. 1). This chamber and related areas to be presently described accommodates a rotor designated in its entirety by the numeral 44, shown by itself in FIG. 3.

Figure 3:
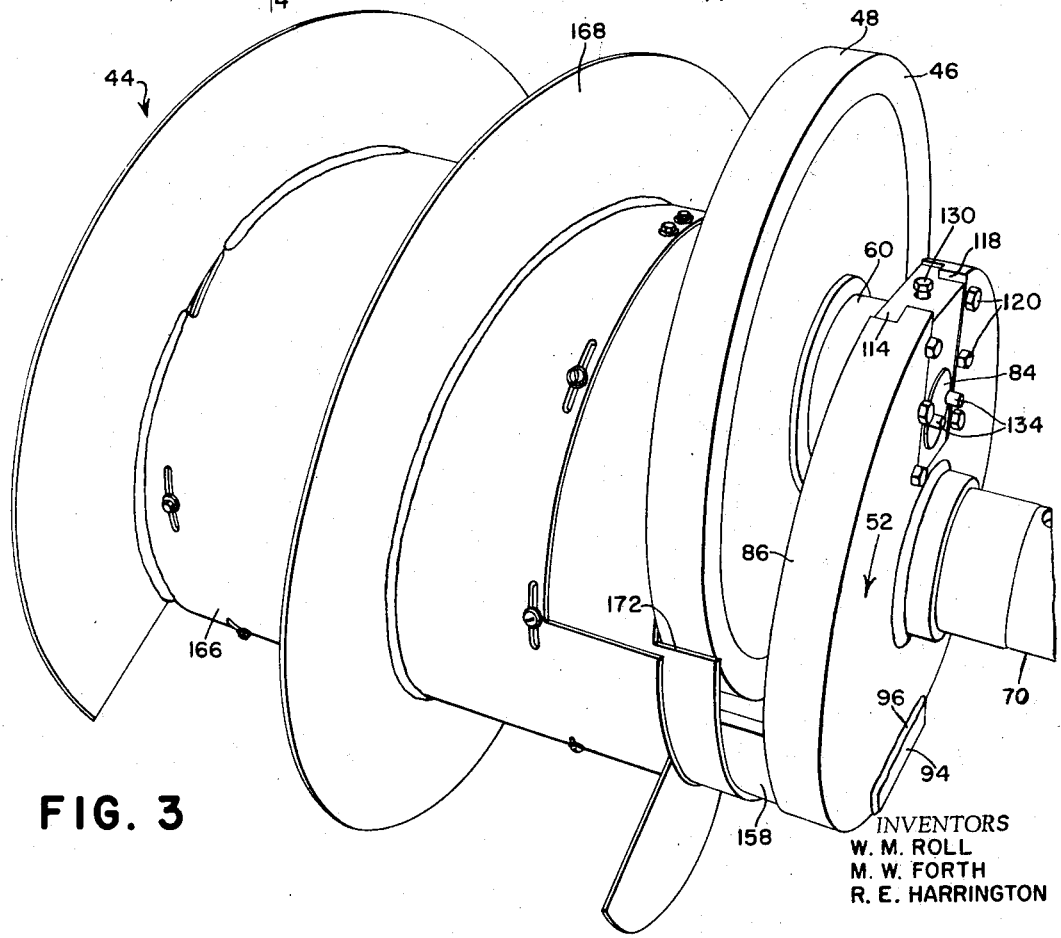
FIG. 3 is an enlarged perspective of the rotor assembly.

The rotor includes provision for mounting a press wheel 46 for orbiting or planetary travel about the interior of the annulus, with the outer periphery of the wheel 46, as at 48, substantially in rolling contact with the "circle" on which the inner ends of the die blocks 14 lie. It will be seen that there is a slight clearance between the periphery of the wheel 46 and the periphery of the annulus. It will also be noted that the area in a counterclockwise direction from the area of substantial contact between the press wheel 46 and the interior of the annulus establishes what is known as a "crescent" 50, to which material is fed from the chamber 38 as the press wheel 46 orbits about the axis A in the direction of the arrow 52 (FIGS. 3 and 6). Thus, material introduced to this crescent is forced by the periphery of the wheel 46, which of course rolls in the direction of the arrow 54 (FIG. 6), radially outwardly into the die openings 16, which material is ultimately compacted in the die openings and subsequently ejected therefrom as wafers having substantially the same cross-sectional shape as the openings.

For the purpose of carrying the press wheel for orbiting movement as just described, a wheel shaft 56 journals the wheel at its center and lies on an axis B eccentric and parallel to the axis A of the annulus. Any suitable anti-friction bearing 58 is utilized to journal the hub 60 of the press wheel on the shaft 56, and this bearing is axially confined at opposite sides by a pair of snap rings 62 which are receivable in the hub 60 but which are clear of the shaft 56. Therefore, the wheel is capable of limited axial shifting on the shaft, which is significant from the standpoint of enabling the periphery of the wheel 46 to better follow the track about the interior of the annulus, it being understood that this track is formed by the interior periphery of the annulus as well as by the radially overlapping portions, as at 64 and 66, of the annulus plates 18 and 20 respectively. Stated otherwise, the "circle" on which the inner ends of the die blocks 14 lie is of larger diameter than the interior diameter of the cylindrical housing 26.

The wheel shaft 56 is part of a basic multi-piece crank shaft structure including a first support or main shaft 68 and a second support or stub shaft 70, coaxial on the axis A of the annulus. The main shaft 68 has one terminal end closely adjacent to one side of the press wheel 46 (the right hand side as seen in FIG. 4) and at this point is in radial register with a reduced end 72 formed on the wheel shaft 56. The other end of the main shaft is reduced at 74 and is journaled in a bearing 76 mounted in a carrier or cup 78 which is in turn rigidly secured coaxially to the end wall structure 34. The cup 78 at its outer side (right hand side as seen in FIG. 4) is surrounded by a collar 80 which is welded into the structure comprising the wall 34 and ribs 36. Cap screws 82 that hold the cup or carrier 78 in place are readily accessible from exteriorly of the structure 34, since the collar 80 is open at that end.

Figure 8:
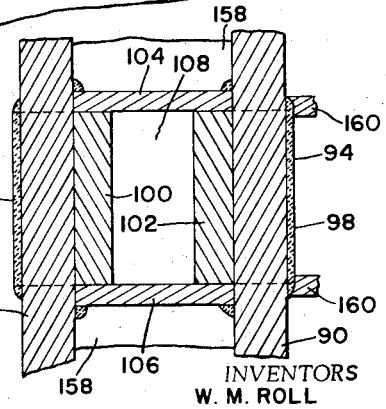
FIG. 8 is a fragmentary sectional view as would be seen along the line 8—8 of FIG. 4.

The opposite end of the shaft 56 is reduced at 84 and is in radial register with the proximate or inner end of the stub shaft 70, the position of the shaft 56 relative to the coaxial stub and main shafts 70 and 68 being that occupied by the crank pin on a typical crank shaft, except in this case the relationship between the three shafts is significantly different. For this purpose, the inner end of the shaft 70 has rigidly secured thereto a first cheek member 86, rigid affixation being effected as by welding at 88. A substantially similar cheek member 90 is rigidly secured as by welding at 92 to the terminal end of the main shaft 68, it being clear that the cheek members 86 and 90 are parallel in spaced apart radial planes normal to the axes A and B. For reasons to be presently explained, each cheek member is substantially circular in elevation, with minor exceptions to be hereinafter noted and, in the posture of the rotor 44 in FIG. 4, the press wheel shaft 56 is carried by the upper portions of the cheek members and the lower portions of the cheek members depend below the periphery of the press wheel, in which area the depending portions are rigidly tied together by a structural element 94 which is welded in bridging relationship to the two cheek members at 96 and 98. The cheek members 86, 90 and element 94 provide a rigid U-shaped structure embracing the wheel 46 from the portion thereof diametrically opposite to the "point" of tangency of the wheel and the inner periphery or track of the die annulus. The cheek members are supplemented at their interior surfaces respectively by a pair of radial plates 100 and 102, the former being notched as best shown in FIG. 5 and both being welded respectively to the ends of the shafts 70 and 68, the point being that the entirety constitutes a rigid welded structure affording substantial strength in a direction parallel to the axis A. This structure is further supplemented by a pair of bridging plates 104 and 106 (FIG. 8), arranged relative to the plates 100 and 102 so as to form a pocket closed at its bottom by the intervening portion of the cross element 94. As best seen in FIGS. 4 and 6, this pocket is diametrically opposed to the location of the press wheel shaft 56 and is adapted to receive weights (not shown) for balancing purposes. To further augment the structural strength of the assembly, the depending portions of the cheeks 86 and 90 are notched to receive the cross element 94, as shown at 110 and 112.

Figure 7:
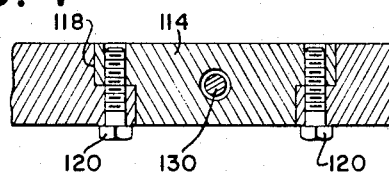
FIG. 7 is an enlarged section as seen along the line 7—7 of FIG. 6.

Each cheek member is provided with means for carrying the associated end of the press wheel shaft 56. For the cheek 86, this means includes a mounting block 114 having therein a cylindrical bore 116 dimensioned to relatively snugly fit the press wheel shaft end 84. The associated portion of the cheek 86 has therein a radial notch or slot 118 of stepped cross-section (FIG. 7) which corresponds to the cross-section of the associated block 114 and which therefore establishes a keyed relationship between the two when the block is received in the slot or notch. Retention of the block in place is achieved by a plurality of cap screws 120. The axially opposite portion of the cheek 90 is provided with a similar slot 122 which receives a similar block 124, this block having a cylindrical bore 126 which receives the associated end 72 of the shaft 56. Cap screws at 128 hold the block 124 in place. At this point, it should be observed that although the wheel shaft end portions 72 and 84 are coaxial, they are coaxial with each other only but are eccentric to the main axis B of the wheel shaft, having their own common axis as shown at C in FIG. 6. This means that the shaft ends 72 and 84 are of course eccentric to the main body or journalling portion of the shaft and consequently if the shaft is turned about the bearing surfaces provided at 84–116 and 72–126, the eccentricity of the axis B relative to the axis A will be affected and consequently the clearance between the periphery 48 of the press wheel and the inner "circle" of the annulus will be changed, which is required from time to time, but only to accommodate manufacturing tolerances and wear but also to accommodate different types of material being wafered. Once the position of the axis B has been established relative to the axis A, it is secured against accidental change, which is here accomplished by releasable means in the form of locking screws 130 and 132 respectively in the blocks 114 and 124 and engaging the wheel shaft end portions 84 and 72. When these two screws are loosened, the wheel shaft as a whole may be turned about the axis C, and the end 84 of the shaft 56 is provided at its outer face with a pair of rigid diametrically spaced lugs or pins 134 between which a suitable tool may be placed for applying the necessary angular force.

Because of the reduction in diameter between the main body of the wheel shaft and its ends 72 and 84, shoulders occur at 136 and 138 which respectively abut the inner radial faces of the blocks 114 and 124. When the screws 130 and 132 are tightened, the shaft 56 becomes in effect a part of the assembly made up of 70-86-56-90-68, and the press wheel 46 is journaled between the cheek members 86 and 90 which in turn are rigidly cross connected by the structure at 94 and its allied members 100, 102, 104, and 106. Thus, bending forces imposed on the shaft 56 as the press wheel 46 forces material through the die openings 16 are resisted by the member 94 and its related components so as to prevent axial spreading of the cheeks 86 and 90 and thus of course eliminating bending in the main shaft and stub shaft relationship. The axial width of the hub 60 of the wheel 46 is less than the axial spacing between the cheeks and, as previously stated, the wheel is axially shiftable within limits to improve its "tracking" in the annulus, the axial limits being established by the difference in axial dimension between the hub and the spacing between the cheeks, as will be clear from FIG. 4.

The outer end of the rotor 44 is carried by a suitable bearing 140 which is mounted in a cup or carrier 142 secured by cap screws 144 to an outer radial end wall structure 146 which inturn may be a rigid part of the outer annulus plate 18, which is secured to the wall 64 by an intervening ring 148 externally reenforced by radial fins or webs 150. The central interior portion of the wall 146 is structurally backed up by a smaller circular plate 152 which is centrally apertured (FIG. 4) to accommodate the bearing cup 142 and which is additionally braced to the interior marginal portion 64 of the annulus plate 18 by fins or webs 154. At this point, it should be observed that in the section taken for the purpose of FIG. 6, certain of these extraneous parts have been omitted in the interests of clarifying the rotor structure.

The shaft 70 is extended axially outwardly beyond the bearing 140 and is keyed or otherwise rigidly secured coaxially to a driving sprocket 156 which serves to rotate the entire rotor structure 44 about the axis A as the press wheel, rotating about its axis B, orbits about the interior of the annulus to perform the function already described.

The structure forming the pocket 108 in diametrically opposed and balanced relation to the press wheel shaft 56 may be supplemented by a pair of arcuate members 158, which may be welded in place between the cheek members 86, and 90. When considered in conjunction with the element 94, the structure 158-94-158 may be regarded as a generally semicircular peripheral closure for that portion of the space between the cheeks not occupied by the press wheel 46.

The structural strength of the rotor, particularly as respects the relationship between the main shaft 68 and the proximate cheek member 90, is further improved by a pair of parallel plates 160 which lie respectively at diametrically opposite sides of the main shaft 68 (FIG. 6). These plates or reenforcing elements, which as will be seen are both radially and axially directed, are rigidly secured to the main shaft through the medium of the provision of a plurality of rods 162 which function as fillets in the "corners" established at the four junctions of the plates and the cylindrical surface of the shaft, and these rods are welded in place to said surface and to the proximate plates. The plates are in addition welded to the proximate face of the cheek member 90. This structure is additionally augmented by the provision of a pair of diametrically opposed radially and axially extending plates 164, normal to the plates 160 and welded to the components already identified.

The main shaft and associated plate or reenforcing element structure is coaxially surrounded by a tubular or cylindrical casing 166 which establishes the core for an auger bight 168. The casing is suitably attached to the interior structure 68-160 as by the supporting brackets 170, coaxially spaced apart adjacent to opposite ends of the structure. The auger thus rotates with the remainder of the rotor. At its end adjacent to the cheek members, the auger is axially extended as a generally semicylindrical shield section 172 having relatively close clearance to the periphery 48 of the wheel 46 (FIG. 3). In this area, the auger core concentrically surrounds the associated or approximate cheek member 90, the latter being, as previously described, substantially circular. An aperture 174 is provided in the auger core 166 in radial register with the screw 132 so as to afford access thereto. In a preferred embodiment, the press wheel 46 would be provided with a plurality of uniformly circumferentially spaced circular openings on axes parallel to the axis B, and which would afford access through the wheel to the screw 132. An appropriate opening could be provided in the ring 148 for access to the screw 130. In situations in which material disassembly is required, the housing structure could readily be separated to permit removal of the rotor in its entirety, after which maintenance or service on the rotor could be easily performed.

From the foregoing description, it will be seen that an improved rotor structure has been provided in which the parts bearing the brunt of the substantial forces is of rigid heavy-duty construction. The basic rotating part comprising the crank shaft and auger core are rigidly tied together, and the journalling of the press wheel 46 on the shaft 56 is such, in conjunction with the cross element 94, that distortion of the structure by bending forces is eliminated. At the same time, the press wheel shaft 56 may be easily removed from the remainder of the crank shaft structure. Also, adjustment of the eccentricity of the shaft 56 relative to the annulus or main shaft axis A is easily effected. Features and advantages other than those already enumerated will readily occur to those versed in the art, as will many modifications and alterations in the preferred embodiment disclosed, all of which may be achieved without departure from the spirit and scope of the invention.

What is claimed is:

1. In a wafering machine, the combination of support means; die means in the form of an annulus carried by the support means and including a plurality of uniformly circumferentially spaced generally radial die openings and an inner periphery from which said openings radiate; a single circular press wheel arranged eccentrically within said periphery of orbit about the axis of the annulus with the outer periphery of said wheel substantially in rolling contact with the annulus periphery to force material into said openings; a crankshaft carrying the wheel, including a wheel shaft extending coaxially through and journaling the wheel and having opposite end portions projecting axially beyond opposite sides of said wheel, a first support shaft extending away from one side of the wheel on the axis of the annulus and having a portion proximate to and axially short of said one side of the wheel, a second support shaft extending away from the other side of the wheel in coaxially spaced relation to the first support shaft and having a portion proximate to and axially short of said other side of the wheel; a pair of cheek members respectively at opposite sides of the press wheel and rigidly secured respectively to said portions of the first and second support shafts, each cheek member having a first portion extending into radially overlapping relation to the associated end of the wheel shaft and a second diametrically opposite portion extending radially beyond the periphery of the wheel, means connecting the first portions of the cheek members respectively to the wheel shaft ends and tying the wheel shaft and first portions rigidly together against relative axial displacement, and means rigidly cross-connecting said second portions of the cheek members; and bearing means journalling the first and second support shafts on the support means.

2. The invention defined in claim 1, in which: said second cheek portions are of substantial area radially of the wheel and the cross-connecting means is of substantial extent circumferentially of the wheel so as to enclose a substantial portion of the wheel diametrically opposite to its point of rolling contact with the periphery of the annulus.

3. The invention defined in claim 1, including: feed means at the side of the support means at which the first support shaft extends and including an element coaxial with said first support shaft and having a substantially circular end proximate to the cheek at the main shaft side of the press wheel, said cheek being comparably substantially circular, and means connecting said element end to and for rotation with the crankshaft.

4. In a wafering machine, the combination of support means; a die annulus carried by the support means and including a plurality of uniformly circumferentially spaced generally radial die openings and an inner periphery from which said openings radiate and annular means at each side of and of lesser diameter than said periphery and combining therewith to provide an annular press-wheel-receiving track; a single circular press wheel arranged eccentrically within said periphery to orbit about the axis of the annulus with the outer periphery of said wheel running in said track to force material into said openings, the periphery of said wheel having an axial width slightly less than that of said track; a crankshaft carrying the wheel, including a wheel shaft extending coaxially through and journaling the wheel and having opposite end portions projecting axially beyond opposite sides of said wheel, a first support shaft extending away from one side of the wheel on the axis of the annulus and having a portion proximate to and axially short of said one side of the wheel, a second support shaft extending away from the other side of the wheel in coaxially spaced relation to the first support shaft and having a portion proximate to and axially short of said other side of the wheel, a pair of cheek members respectively at opposite sides of the press wheel and rigidly secured respectively to said portions of the first and second support shafts, each cheek member having a first portion extending into radially overlapping relation to the associated end of the wheel shaft and a second diametrically opposite portion extending radially beyond the periphery of the wheel, means connecting the first portions of the cheek members respectively to the wheel shaft end portions and tying the wheel shaft and first portions rigidly together against relative axial displacement, and means rigidly cross-connecting said second portions of the cheek members, said cheek members being axially spaced apart along the wheel shaft to leave axial clearance between said members and the wheel to enable the wheel to partake of limited axial shifting on said wheel shaft for accommodating the periphery of said wheel to said track; and bearing means journaling the first and second support shafts on the support means.

5. In a wafering machine, the combination of support means; a die annulus carried by the support means and including a plurality of uniformly circumferentially spaced generally radial die openings and an inner periphery from which said openings radiate and annular means at each side of and of lesser diameter than said periphery and combining therewith to provide an annular press-wheel-receiving track; a circular press wheel arranged eccentrically within said periphery to orbit about the axis of the annulus with the outer periphery of said wheel running in said track to force material into said openings, the periphery of said wheel having an axial width slightly less than that of said track; a crankshaft carrying the wheel, including a wheel shaft extending coaxially through and journaling the wheel and having opposite end portions projecting axially beyond opposite sides of said wheel, a first support shaft extending away from one side of the wheel on the axis of the annulus and having a portion proximate to and axially short of said one side of the wheel, a second support shaft extending away from the other side of the wheel coaxially with the first support shaft and having a portion proximate to and axially short of said other side of the wheel, a pair of cheek members respectively at opposite sides of the press wheel and rigidly secured respectively to said portions of the first and second support shafts, and means connecting the cheek members respectively to the wheel shaft end portions and tying the wheel shaft and said members rigidly together against relative axial displacement, said cheek members being axially spaced apart along the wheel shaft to leave axial clearance between said members and the wheel to enable the wheel to partake of limited axial shifting on said wheel shaft for accommodating the periphery of said wheel to said track; and bearing means journaling the first and second support shafts on the support means.

6. In a wafering machine, the combination of support means; die means in the form of an annulus carried by the support means and including a plurality of uniformly circumferentially spaced generally radial die openings and an inner periphery from which said openings radiate; a circular press wheel arranged eccentrically within said periphery to orbit about the axis of the annulus with the outer periphery of said wheel substantially in rolling contact with the annulus periphery to force material into said openings; a wheel shaft extending coaxially through and journaling the wheel and having opposite end portions projecting axially beyond opposite sides of said wheel; a first support shaft extending away from one side of the wheel on the axis of the annulus and having an end portion proximate to said one side of the wheel; means journaling said first support shaft on the support means; a second support shaft extending away from the other side of the wheel coaxially with the first support shaft and having a portion proximate to said other side of the wheel; means journaling the second support shaft on the support means; a pair of cheek members respectively at opposite sides of the press wheel and rigidly secured respectively to said portions of the first and second support shafts, each cheek member having a first portion extending into radially overlapping relation to the associated end of the wheel shaft and a second diametrically opposite portion extending radially beyond the periphery of the wheel; means connecting the first portions of the cheek members respectively to the wheel shaft end portions and tying the wheel shaft and first portions of the cheek members rigidly together against relative axial displacement and including provision for adjustment of the eccentricity of the wheel shaft and press wheel relative to the annulus; and means rigidly cross-connecting said second portions of the cheek members.

7. In a wafering machine, the combination of support means; die means in the form of an annulus carried by the support means and including a plurality of uniformly circumferentially spaced generally radial die openings and an inner periphery from which said openings radiate; a circular press wheel arranged eccentrically within said periphery to orbit about the axis of the annulus with the outer periphery of said wheel substantially in rolling contact with the annulus periphery to force material into said openings; a wheel shaft extending coaxially through and journaling the wheel and having opposite end portions projecting axially beyond opposite sides of said wheel; a first support shaft extending away from one side of the wheel on the axis of the annulus and having a portion proximate to said one side of the wheel; means journaling said first support shaft on the support means; a second support shaft extending away from the other side of the wheel coaxially with the first support shaft and having a portion proximate to said other side of the wheel; means journaling the second support shaft on the support means; a pair of cheek members respectively at opposite sides of the press wheel and rigidly secured respectively to said portions of the first and second support shafts, each cheek member having a first portion extending into radially overlapping relation to the associated end of the wheel shaft and a second diametrically opposite portion extending radially beyond the periphery of the wheel; means connecting the first portions of the cheek members respectively to the wheel shaft ends and tying the wheel shaft and first portions of the cheek members rigidly together against relative axial displacement and including, in each first portion, a radially outwardly opening slot of a circumferential width greater than the diameter of the associated wheel shaft end, a block dimensioned to snugly fit the associated slot and apertured to receive the associated wheel shaft end, means securing said wheel shaft end to said block, and means securing said block to the associated end portion; and means rigidly cross-connecting said second portions of the cheek members.

8. The invention defined in claim 7, in which: each wheel shaft end is cylindrical on an axis eccentric to the wheel shaft axis, each block is apertured with a comparable cylindrical bore receiving said cylindrical shaft end, and each means that secures said wheel shaft end to its block normally holds the wheel shaft against rotation but is releasable to enable turning of said wheel shaft in said bores for varying the eccentricity of the wheel shaft to the axis of the annulus.

9. In a wafering machine, the combination of support means; die means in the form of an annulus carried by the support means and including a plurality of uniformly circumferentially spaced generally radial die openings and an inner periphery from which said openings radiate; a circular press wheel arranged eccentrically within said periphery to orbit about the axis of the annulus with the outer periphery of said wheel substantially in rolling contact with the annulus periphery to force material into said openings; a wheel shaft extending coaxially through and journaling the wheel and having opposite ends projecting axially beyond opposite sides of said wheel; a first support shaft extending away from one side of the wheel on the axis of the annulus and having a portion proximate to said one side of the wheel; means journaling said first support shaft on the support means; a bearing on said first support shaft relatively axially remote from said one side of the press wheel, said first support shaft including radially and axially directed web-like reenforcing elements rigidly secured thereto between said bearing and the proximate cheek member and further rigidly secured to said proximate cheek member, and said means that journals said first support shaft further including rigid housing structure secured to the annulus and extending axially to the bearing in surrounding relation to said first support shaft, and said elements and said structure having means carrying said bearing; a second support shaft extending away from the other side of the wheel coaxially with the first support shaft and having a portion proximate to said other side of the wheel; means journaling the second support shaft on the support means; a pair of cheek members respectively at opposite sides of the press wheel and rigidly secured respectively to said portions of the first and second support shafts, each cheek member having a first portion extending into radially overlapping relation to the associated end of the wheel shaft and a second diametrically opposite portion extending radially beyond the periphery of the wheel; means connecting the first portions of the cheek members respectively to the wheel shaft ends and tying the wheel shaft and the cheek member first portions rigidly together against relative axial displacement; and means rigidly cross-connecting said second portions of the cheek members.

10. The invention defined in claim 9, including: a hollow cylindrical casing concentric with said first support shaft within the housing structure and surrounding said first support shaft and said reenforcing elements; and means mounting the casing on and for rotation with said first support shaft and elements.

11. The invention defined in claim 10, in which: the casing has a coaxial extension at its end proximate to the press wheel and said extension surrounds the proximate cheek member, said cheek member being generally circular about the first support shaft axis.

12. In a wafering machine, the combination of support means; die means in the form of an annulus carried by the support means and including a plurality of uniformly circumferentially spaced generally radial die openings and an inner periphery from which said openings radiate; a circular press wheel arranged eccentrically within said periphery to orbit about the axis of the annulus with the outer periphery of said wheel substantially in rolling contact with the annulus periphery to force material into said openings; a wheel shaft extending coaxially through and journaling the wheel and having opposite ends projecting axially beyond opposite sides of said wheel; a first support shaft extending away from one side of the wheel on the axis of the annulus and having a portion proximate to said one side of the wheel; means journaling said first support shaft on the support means; a second support shaft extending away from the other side of the wheel coaxially with the first support shaft and having a portion proximate to said other side of the wheel; means journaling the second support shaft on the support means; a pair of cheek members respectively at opposite sides of the press wheel and rigidly secured respectively to said portions of the first and second support shafts, each cheek member having a first portion extending into radially overlapping relation to the associated end of the wheel shaft and a second diametrically opposite portion extending radially beyond the periphery of the wheel; means connecting the first portions of the cheek members respectively to the wheel shaft ends and tying the wheel shaft and first portions of the cheek members rigidly together against relative axial displacement; and means rigidly cross-connecting said second portions of the cheek members, and including portions providing a weight-receiving pocket diametrically opposite to the press wheel shaft.

13. In a wafering machine, the combination of support means; die means in the form of an annulus carried by the support means and including a plurality of uniformly circumferentially spaced generally radial die openings and an inner periphery from which said openings radiate; a circular press wheel arranged eccentrically within said periphery to orbit about the axis of the annulus with the outer periphery of said wheel substantially in rolling contact with the annulus periphery to force material into said openings; a wheel shaft extending coaxially through and journaling the wheel and having opposite ends projecting axially beyond opposite sides of said wheel; a first support shaft extending away from one side of the wheel on the axis of the annulus and having a portion proximate to said one side of the wheel; means journaling said first support shaft on the support means; a second support shaft extending away from the other side of the wheel coaxially with the first support shaft and having a portion proximate to said other side of the wheel; means journaling the second support shaft on the support means; a pair of check members respectively at opposite sides of the press wheel and rigidly secured respectively to said portions of the first and second support shafts; each cheek member having a first portion extending into radially overlapping relation to the associated end of the wheel shaft and a second diametrically opposite portion extending radially beyond the periphery of the wheel; means connecting the first portions of the cheek members respectively to the wheel shaft ends and tying the wheel shaft and said first portions rigidly together against relative axial displacement; and means rigidly cross-connecting said second portions of the cheek members, and including a first element disposed crosswise of and between the cheek members generally on a chord of a circle about the axis of the annulus and a pair of second elements adjacent to the first element and disposed crosswise of and between the cheek members in circumferentially spaced relation and substantially parallel to a diameter through the first element, said second elements being rigidly secured to the first element and to the cheek members.

14. In a wafering machine, the combination of support means; die means in the form of an annulus carried by the support means and including a plurality of uniformly circumferentially spaced generally radial die openings and an inner periphery from which said openings radiate; a circular press wheel arranged eccentrically within said periphery to orbit about the axis of the annulus with the outer periphery of said wheel substantially in rolling contact with the annulus periphery to force material into said openings; a wheel shaft extending coaxially through and journaling the wheel and having opposite ends projecting axially beyond opposite sides of said wheel; a first support shaft extending away from one side of the wheel on the axis of the annulus and having a portion proximate to said one side of the wheel; means journaling said first support shaft on the support means; a second support shaft extending away from the other side of the wheel coaxially with the first support shaft and having a portion proximate to said other side of the wheel; means journaling the second support shaft on the support means; a pair of cheek members respectively at opposite sides of the press wheel and rigidly secured respectively to said ends of the first and second support shafts, each cheek member having a first portion extending into radially overlapping relation to the associated end of the wheel shaft and a second diametrically opposite portion extending radially beyond the periphery of the wheel, said cheek members being similarly generally circular about the axis of the annulus, and arcuate filler means concentrically disposed between and secured to the cheek member second portions and extending arcuately toward said first portions to close that part of the space between the cheek members not occupied by the press wheel; means connecting the first portions of the cheek members respectively to the wheel shaft ends and tying the wheel shaft and said first portions rigidly together against relative axial displacement; and means rigidly cross-connecting said second portions of the cheek members.

15. In a wafering machine, the combination of support means; die means in the form of an annulus carried by the support means and including a plurality of uniformly circumferentially spaced generally radial die openings and an inner periphery from which said openings radiate; a circular press wheel arranged eccentrically within said periphery to orbit about the axis of the annulus with the outer periphery of said wheel substantially in rolling contact with the annulus periphery to force material into said openings; a wheel shaft extending coaxially through and journaling the wheel and having opposite ends projecting axially beyond opposite sides of said wheel; a first support shaft extending away from one side of the wheel on the axis of the annulus and having a portion proximate to said one side of the wheel; means journaling said first support shaft on the support means; a second support shaft extending away from the other side of the wheel coaxially with the first support shaft and having a portion proximate to said other side of the wheel; means journaling the second support shaft on the support means; a pair of cheek members respectively at opposite sides of the press wheel and rigidly secured respectively to said portions of the first and second support shafts, each cheek member having a first portion extending into radially overlapping relation to the associated end of the wheel shaft and a second diametrically opposite portion extending axially beyond the periphery of the wheel; means connecting the first portions of the cheek members respectively to the wheel shaft ends and tying the wheel shaft and said first portions rigidly together against relative axial displacement, said connecting means being disconnectible to enable radial separation of the wheel shaft and wheel from the cheek members; and means rigidly cross-connecting said second portions of the cheek members.

16. In a wafering machine, the combination of support means; die means in the form of an annulus carried by the support means and including a plurality of uniformly circumferentially spaced generally radial die openings and an inner periphery from which said openings radiate; a circular press wheel arranged eccentrically within said periphery to orbit about the axis of the annulus with the outer periphery of said wheel substantially in rolling contact with the annulus periphery to force material into said openings; a wheel shaft extending coaxially through and journaling the wheel and having opposite ends projecting axially beyond opposite sides of said wheel; a first support shaft extending away from one side of the wheel on the axis of the annulus and having a portion proximate to said one side of the wheel; means journaling said first support shaft on the support means; a second support shaft extending away from the other side of the wheel coaxially with the first support shaft and having a portion proximate to said other side of the wheel; means journaling the second support shaft on the support means; a pair of cheek members respectively at opposite sides of the press wheel and rigidly secured respectively to said portions of the first and second support shafts, each cheek member having a first portion extending into radially overlapping relation to the associated end of the wheel shaft and a second diametrically opposite portion extending radially beyond the periphery of the wheel; means connecting the first portions of the cheek members respectively to the wheel shaft ends and typing the wheel shaft and said first portions rigidly together against relative axial displacement; means rigidly cross-connecting said second portions of the cheek members; and feed means including a housing carried by the support means at one side of the annulus and having an annular wall coaxial with said annulus and of a diameter at the annulus on the order of that of said annulus periphery, and a rotary feed element coaxially within the housing and connected to one of the support shafts for rotation therewith and relative to said housing, said element having an annular end portion adjacent to the respective cheek member and coaxial with the annulus and of a diameter smaller than that of said wall but large enough to lie on a circle radially outwardly of both the press wheel shaft and the means that rigidly cross-connects the second portions of the cheek members.

17. In a wafering machine, the combination of support means; die means in the form of an annulus carried by the support means and including a plurality of uniformly circumferentially spaced generally radial die openings and an inner periphery from which said openings radiate; a circular press wheel arranged eccentrically within said annulus and having its outer periphery generally tangent to the annulus periphery and adapted to orbit about the annulus axis while turning on its own axis and further of such diameter as to radially overlap said annulus axis; a wheel shaft extending coaxially through and journaling the wheel and having opposite ends projecting axially beyond opposite sides of said wheel; a rigid U-shaped structure embracing the wheel from the portion thereof diametrically opposite to said tangent portion, said structure including a cross member lying radially outwardly of said diametric wheel portion and a pair of radial cheek members rigid with said cross member and extending respectively along opposite sides of the wheel and connected respectively to the opposite ends of the wheel shaft; a first support shaft extending away from one cheek member on the axis of the annulus and rigidly connected to said one cheek member; means journaling said first support shaft on the support means; a second support shaft separated from the first support shaft by the press wheel and extending away from the other cheek member on the axis of the annulus and rigidly connected to said other cheek member; and means journaling the second support shaft on the support means.

18. The invention defined in claim 17, including: an auger at one side of the wheel and coaxial with the support shafts and having a core connected to and for rotation with said structure, said core including a part-cylindrical extension embracing said structure.

References Cited

UNITED STATES PATENTS

| | | | |
|---|---|---|---|
| 2,075,450 | 3/1937 | Meakin | 107—8.35 |
| 2,157,528 | 5/1939 | Crabtree | 107—8.35 |
| 2,240,660 | 5/1941 | Meakin | 107—8.35 |
| 2,279,632 | 4/1942 | Meakin | 107—8.35 |
| 2,798,444 | 7/1957 | Meakin | 107—14 |
| 3,327,653 | 6/1967 | Crane | 107—14 |

FOREIGN PATENTS

| | | |
|---|---|---|
| 504,019 | 6/1951 | Belgium. |
| 65,465 | 2/1947 | Denmark. |
| 1,250,174 | 11/1960 | France. |
| 673,293 | 6/1952 | Great Britain. |
| 939,759 | 10/1963 | Great Britain. |

BILLY J. WILHITE, *Primary Examiner.*